(12) United States Patent
Alber (10) Patent No.: US 10,723,451 B2
(45) Date of Patent: Jul. 28, 2020

(54) PROPELLER ROTOR FOR A VERTICAL TAKE OFF AND LANDING AIRCRAFT

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 446 days.

(21) Appl. No.: 15/305,039

(22) PCT Filed: Apr. 22, 2014

(86) PCT No.: PCT/US2014/034972
§ 371 (c)(1),
(2) Date: Oct. 18, 2016

(87) PCT Pub. No.: WO2015/163855
PCT Pub. Date: Oct. 29, 2015

(65) Prior Publication Data
US 2017/0183090 A1 Jun. 29, 2017

(51) Int. Cl.
| B64C 11/18 | (2006.01) |
| B64C 27/82 | (2006.01) |
| B64C 29/02 | (2006.01) |
| B64C 27/10 | (2006.01) |
| B64C 29/00 | (2006.01) |
| B64C 39/02 | (2006.01) |

(52) U.S. Cl.
CPC .............. *B64C 27/82* (2013.01); *B64C 11/18* (2013.01); *B64C 27/10* (2013.01); *B64C 29/0016* (2013.01); *B64C 29/02* (2013.01); *B64C 39/024* (2013.01); *B64C 2027/8227* (2013.01); *B64C 2027/8236* (2013.01); *B64C 2201/024* (2013.01); *B64C 2201/108* (2013.01); *B64C 2201/165* (2013.01)

(58) Field of Classification Search
CPC .................................. B64C 11/28; B63H 1/26
See application file for complete search history.

(56) References Cited

U.S. PATENT DOCUMENTS

| 1,838,453 | A | * | 12/1931 | Rosen | ..................... B64C 11/18 |
| | | | | | 416/237 |
| 2,582,107 | A | * | 1/1952 | Dakin | ..................... B64C 11/16 |
| | | | | | 416/237 |
| 3,171,495 | A | | 2/1965 | Puckett | |
| 3,706,430 | A | | 12/1972 | Kline et al. | |
| 4,235,400 | A | | 11/1980 | Haworth | |

(Continued)

FOREIGN PATENT DOCUMENTS

| FR | 415236 A * | 9/1910 | ............. B64C 11/16 |
| RU | 2222470 C2 | 1/2004 | |
| WO | 2013006082 A1 | 1/2013 | |

OTHER PUBLICATIONS

International Search Report and Written Opinion for Application No. PCT/US2014/034972 dated Jan. 5, 2015; 13 pgs.

*Primary Examiner* — Philip J Bonzell
*Assistant Examiner* — Tye William Abell
(74) *Attorney, Agent, or Firm* — Cantor Colburn LLP (57) ABSTRACT

A propeller blade is provided including a leading edge and a trailing edge. The trailing edge is arranged opposite the leading edge to form an airfoil there between. At least one of the leading edge and the trailing edge include at least one facet.

19 Claims, 9 Drawing Sheets

(56) References Cited

U.S. PATENT DOCUMENTS

| | | | |
|---|---|---|---|
| 4,687,416 A * | 8/1987 | Spranger | B64C 11/18 |
| | | | 416/200 R |
| 4,941,803 A | 7/1990 | Wainauski et al. | |
| 5,785,282 A | 7/1998 | Wake et al. | |
| 5,788,191 A | 8/1998 | Wake et al. | |
| 5,927,948 A * | 7/1999 | Perry | B64C 27/463 |
| | | | 244/17.11 |
| 6,749,401 B2 | 6/2004 | Vanmoor | |
| 2004/0022635 A1 * | 2/2004 | Vanmoor | B63H 1/26 |
| | | | 416/242 |
| 2013/0045107 A1 * | 2/2013 | Topaz | B64C 11/18 |
| | | | 416/243 |
| 2013/0287582 A1 * | 10/2013 | Kucuk | B63H 1/26 |
| | | | 416/223 R |
| 2013/0315733 A1 * | 11/2013 | Kweder | F01D 1/32 |
| | | | 416/91 |
| 2014/0133982 A1 * | 5/2014 | Dejeu | B64C 11/18 |
| | | | 416/1 |

* cited by examiner

PROPELLER ROTOR FOR A VERTICAL TAKE OFF AND LANDING AIRCRAFT

CROSS REFERENCE TO RELATED APPLICATIONS

This application is a National Phase Application of Patent Application PCT/US2014/034972 filed on Apr. 22, 2014, the contents of which are incorporated herein by reference in their entirety.

BACKGROUND OF THE INVENTION

Embodiments of the invention relate to a propeller of a rotary wing aircraft, and more particularly, to reducing the noise generated by the propeller during operation of the aircraft.

Propeller driven aircrafts have near field and interior noise that include noise signature content related to operation of the propeller. Near field noise outside of the aircraft can create pressure fluctuations that may fatigue the structure of the aircraft. This near field noise can also result in interior noise, audible within a cabin of the aircraft, making the aircraft less comfortable for passengers situated therein. Propeller noise will also propagate to the far field becoming an annoyance factor for those living near an airport.

Various methods have been employed to reduce propeller noise, including the use of swept blade propellers, increased blade count, active noise control, and tuned mechanical dampers within or on the fuselage. On multi-engine aircrafts, angular phasing of the propellers has long been used to alter the characteristics of the propeller noise perceptible within the fuselage. In spite of the various methods used to reduce noise generated by the propellers of a propeller driven aircraft, there remains a need for further improvement.

BRIEF DESCRIPTION OF THE INVENTION

According to one embodiment of the invention, a propeller blade is provided including a leading edge and a trailing edge. The trailing edge is arranged opposite the leading edge to form an airfoil there between. At least one of the leading edge and the trailing edge include at least one facet.

In addition to one or more of the features described above, or as an alternative, in further embodiments the leading edge includes at least one leading edge facet and the trailing edge includes at least one trailing edge facet. A width of at least one of the leading edge facets and the trailing edge facets varies over a length of the propeller blade.

In addition to one or more of the features described above, or as an alternative, in further embodiments the at least one face includes facets that extend from a common intersection and are arranged at an angle to one another.

In addition to one or more of the features described above, or as an alternative, in further embodiments a number of leading edge facets is identical to a number of trailing edge facets.

In addition to one or more of the features described above, or as an alternative, in further embodiments a number of leading edge facets is different from a number of trailing edge facets.

In addition to one or more of the features described above, or as an alternative, in further embodiments wherein a contour of the leading edge defined by the leading edge facets is substantially identical to a contour of the trailing edge defined by the trailing edge facets.

In addition to one or more of the features described above, or as an alternative, in further embodiments a contour of the leading edge defined by the leading edge facets is substantially different from a contour of the trailing edge defined by the trailing edge facets.

According to another embodiment of the invention, an aircraft is provided including an airframe and at least one engine mounted to the airframe. A thrust system is operably coupled to the at least one engine. The thrust system includes a hub and a plurality of propeller blades. Each propeller blade includes a leading edge and a trailing edge. The trailing edge is arranged opposite the leading edge to form an airfoil there between. At least one of the leading edge and the trailing edge include at least one facet.

In addition to one or more of the features described above, or as an alternative, in further embodiments the leading edge includes at least one leading edge facet and the trailing edge includes at least one trailing edge facet. A width of at least one of the leading edge facets and the trailing edge facets varies over a length of the propeller blade.

In addition to one or more of the features described above, or as an alternative, in further embodiments the at least one face includes facets that extend from a common intersection and are arranged at an angle to one another.

In addition to one or more of the features described above, or as an alternative, in further embodiments a number of leading edge facets is identical to a number of trailing edge facets.

In addition to one or more of the features described above, or as an alternative, in further embodiments a number of leading edge facets is different from a number of trailing edge facets.

In addition to one or more of the features described above, or as an alternative, in further embodiments wherein a contour of the leading edge defined by the leading edge facets is substantially identical to a contour of the trailing edge defined by the trailing edge facets.

In addition to one or more of the features described above, or as an alternative, in further embodiments a contour of the leading edge defined by the leading edge facets is substantially different from a contour of the trailing edge defined by the trailing edge facets.

In addition to one or more of the features described above, or as an alternative, in further embodiments the rotary wing aircraft is an unmanned aerial vehicle.

Technical effects include a propeller blade having a planform geometry including one or more facets to improve acoustics and noise signature.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
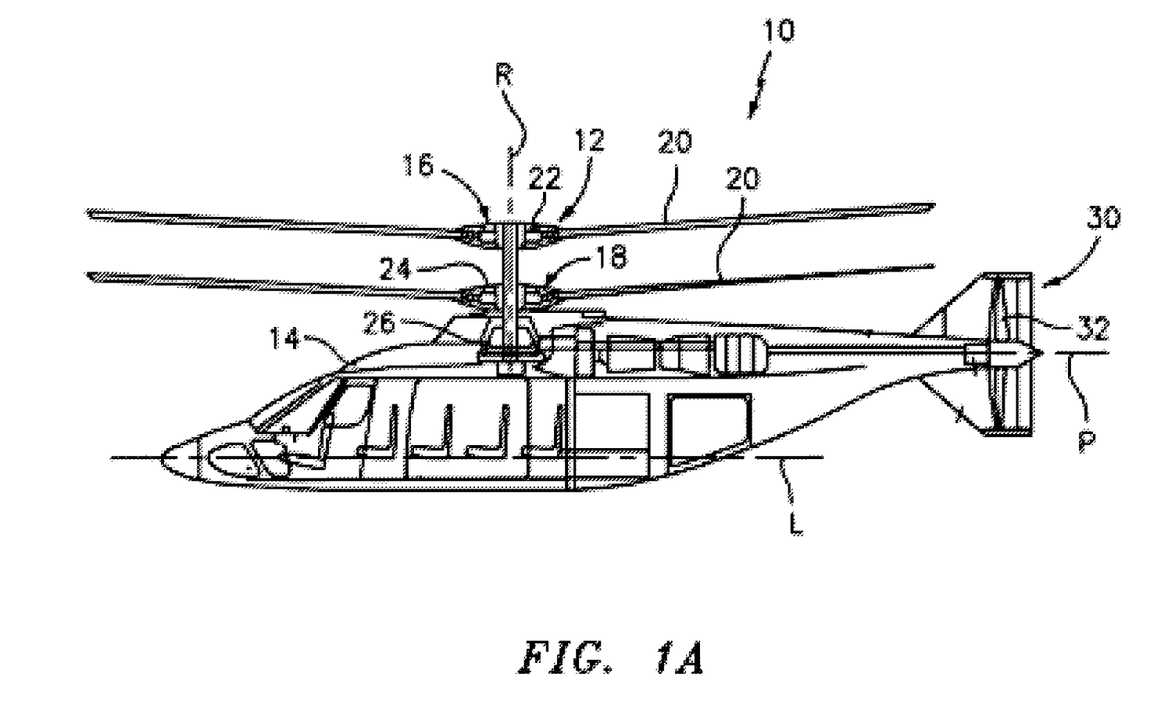
FIGS. 1A and 1B are general views of an exemplary rotary wing aircraft embodiment for use with the present invention.
Figure 1B:
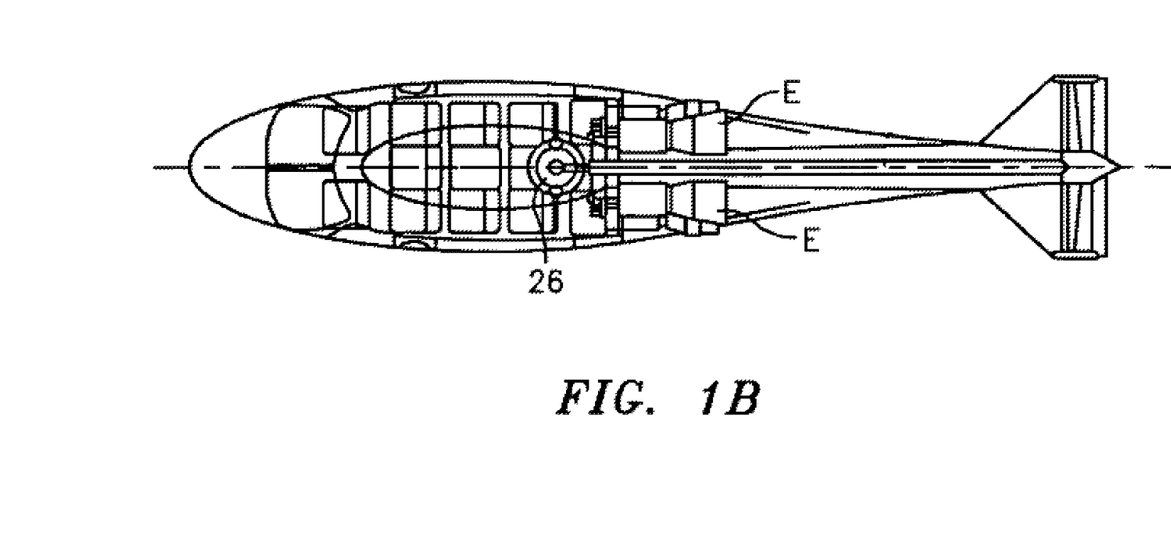

FIGS. 1A and 1B illustrate a vertical takeoff and landing (VTOL) high speed compound or coaxial contra-rotating rigid rotor aircraft 10 having a dual, contra-rotating, coaxial main rotor system 12, which rotates about a rotor axis of rotation A. The aircraft 10 includes an airframe 14 which supports the dual, contra-rotating, coaxial main rotor system 12 as well as a translational thrust system 30 which provides translational thrust generally parallel to an aircraft longitudinal axis L. It should be understood that other aircraft configurations will benefit from the present invention.

The main rotor system 12 includes a first rotor system 16 and a second rotor system 18. Each rotor system 16, 18 includes a plurality of rotor blades 20 mounted to a respective rotor hub 22, 24. The main rotor system 12 is driven by a main gearbox 26. The translational thrust system 30 may be any propeller system (including, but not limited to a pusher propeller, a tractor propeller, a nacelle mounted propeller, etc. . . . ), and can also be other providers of thrust, such as a jet engine, turbo fan etc. In the illustrated embodiment, the translational thrust system includes a pushed propeller system 32 having a propeller rotational axis P oriented substantially horizontal and parallel to the aircraft longitudinal axis L to provide thrust for high speed flight. As shown, the propeller system 32 mounts within an aerodynamic cowling 34 at the rear of the airframe 14, and is also driven by the main gearbox 26.

The main gearbox 26 is driven by one or more engines (illustrated schematically at E). In the case of a rotary wing aircraft, the gearbox 26 is preferably interposed between one or more gas turbine engines E, the rotor system 12 and the translational thrust system 30.

Figure 2A:
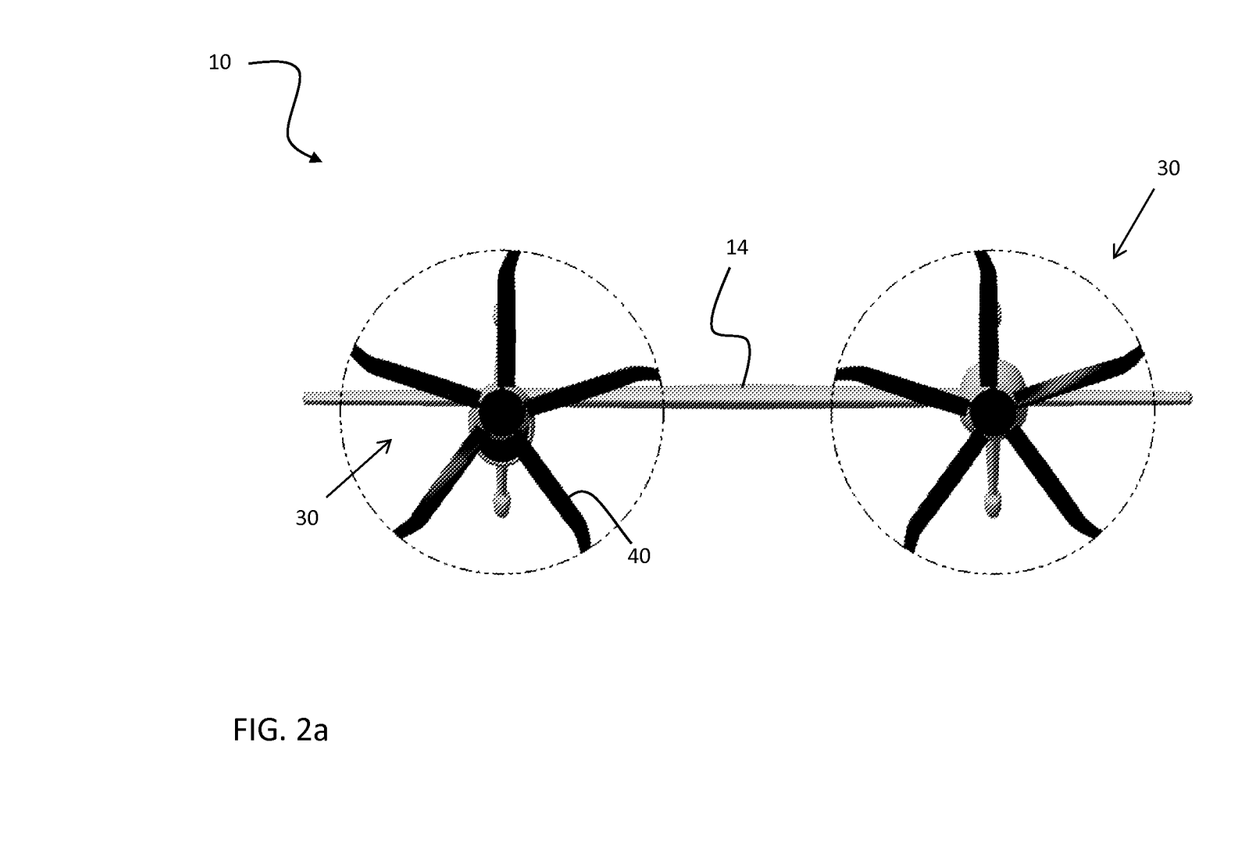
FIGS. 2a and 2b are general views of an exemplary vertical takeoff and landing aircraft configured for use with the present invention.
Figure 2B:
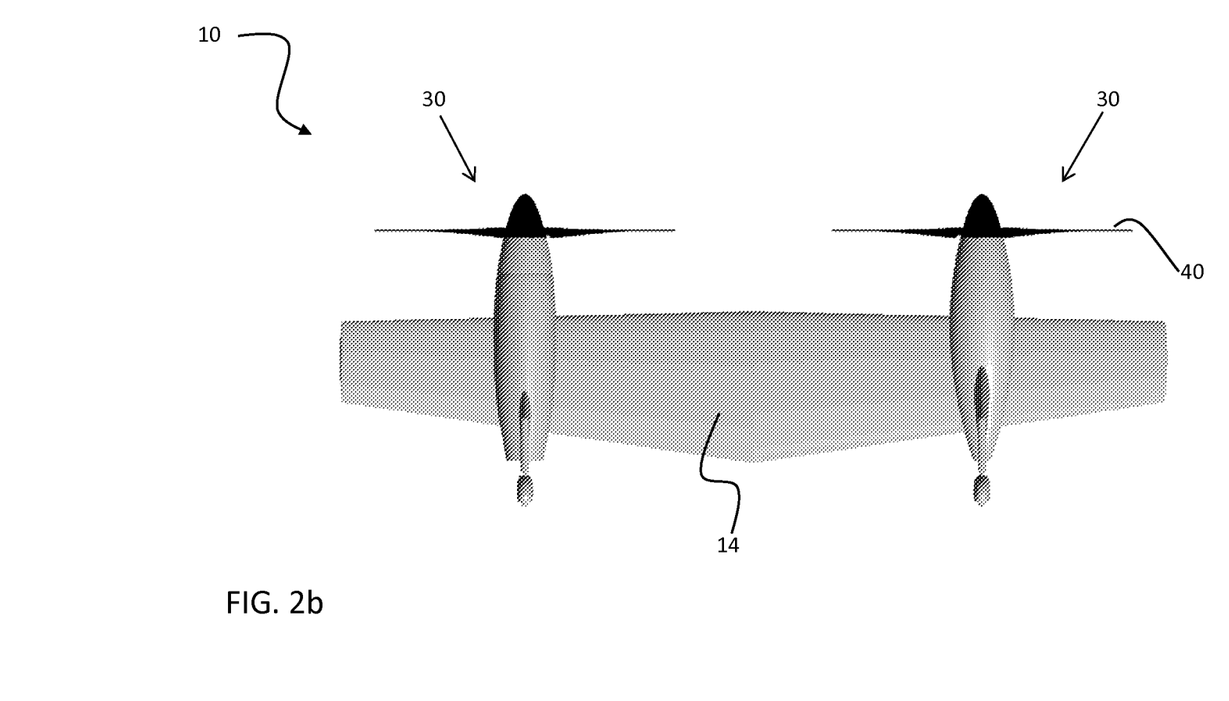

Another example of a VTOL aircraft 10 is illustrated in FIGS. 2a and 2b. In the illustrated, non-limiting embodiment, the VTOL aircraft 10 is an unmanned aerial vehicle having an integrated fixed wing and rotary wing configuration. As shown, multiple thrust systems 30 are mounted to a fixed wing of the airframe. In the illustrated embodiment, the propeller blades 40 of the thrust system 30 have a swept tip geometry configured to increase the speed at which the aircraft 10 travels. However, blades 40 having other tip geometries are within the scope of the invention.

Figure 3:
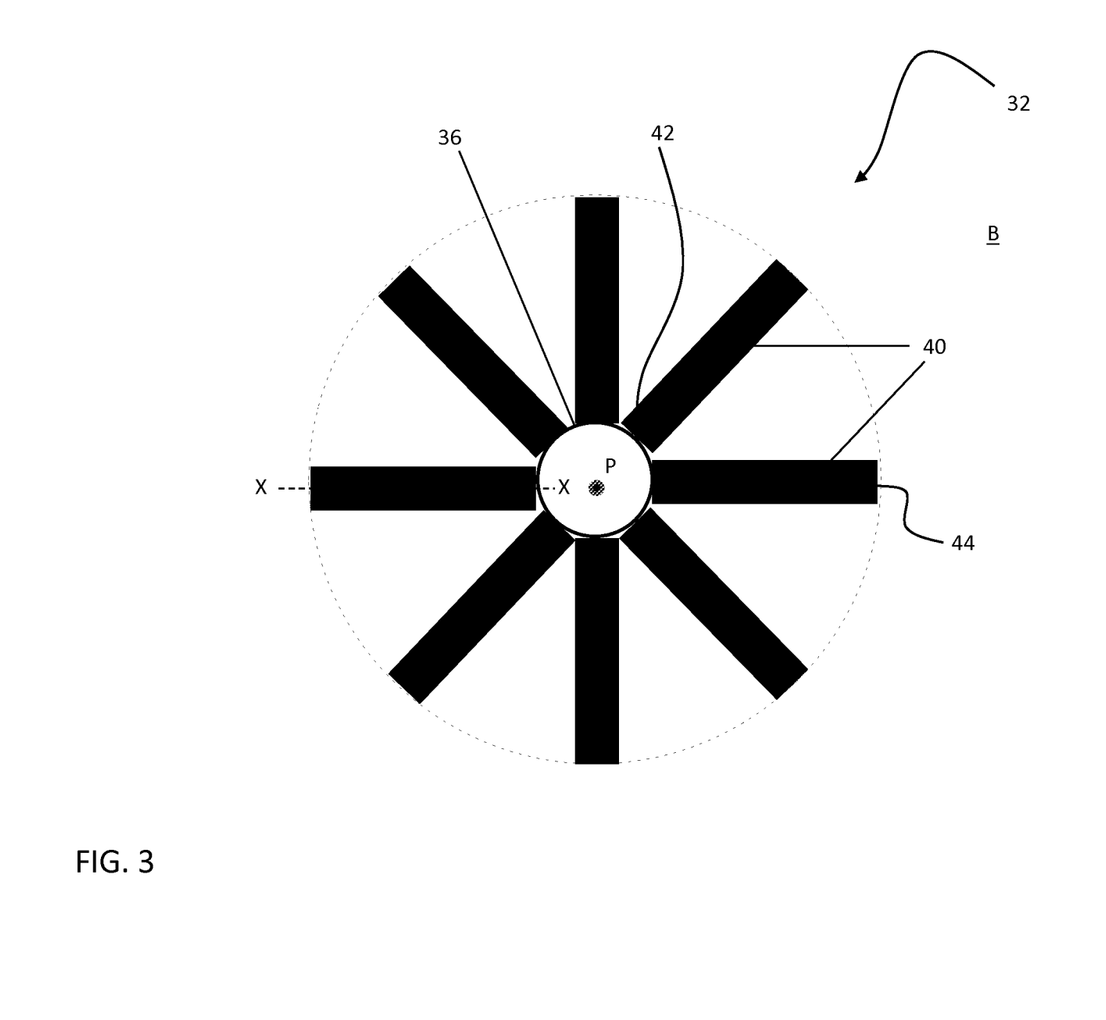
FIG. 3 is a front view of a propeller system according to an embodiment of the invention.

Referring now to FIG. 3, a thrust system 30 of an aircraft 10 such as illustrated in FIGS. 1 and 2 is illustrated in more detail. Although the thrust system 30 is illustrated and described with respect to a VTOL aircraft 10, such as an unmanned aerial vehicle for example, thrust systems 30 used in other applications, such as a fixed wing aircraft or a marine vessel for example, are within the scope of the invention. The thrust system 30 includes a plurality of propeller blades 40 individually mounted at an inboard end 42 to a centrally located hub 36. The hub 36 is configured to rotate about the rotational axis P. Each of the plurality of propeller blades 40 extends radially outward from the hub 36 such that an outboard end 44 of each blade 40 is generally arranged within a plane B. Plane B is oriented substantially perpendicularly to the axis of rotation P of the hub 36. In one embodiment, the thrust system 30 includes a variable pitch system (not shown) such that each propeller blade 40 is rotatable relative to the hub 36 about a pitch axis X extending from the inboard end 42 to the outboard end 44 of each blade 40.

Each of the plurality of propeller blades 40 is substantially identical and the blades 40 are generally equidistantly spaced about the circumference of the hub 36. In the illustrated, non-limiting embodiment, the thrust system 30 has eight propeller blades 40; however, a thrust system 30 having two, three, four or any number of propeller blades 40 are within the scope of the invention.

Figure 4:
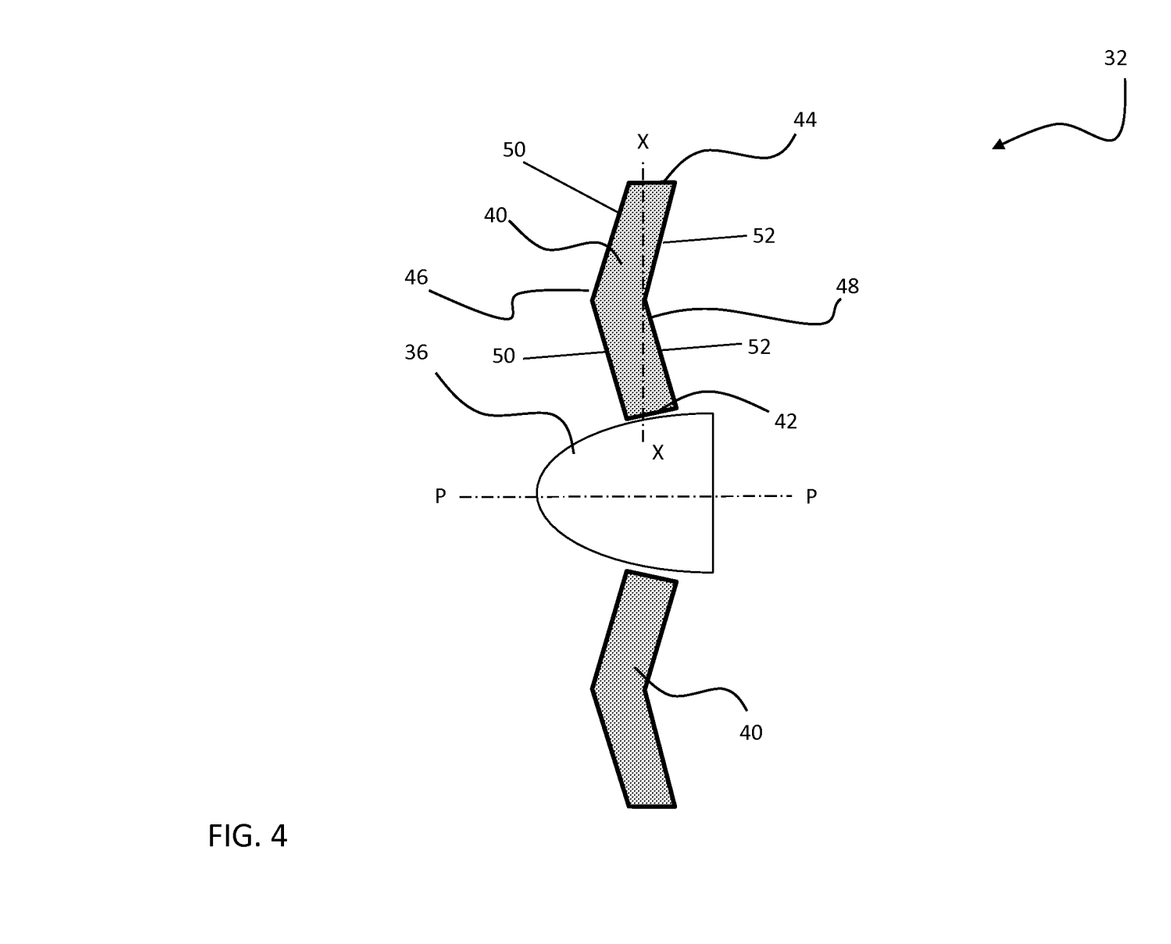
FIG. 4 is a cross-sectional view of a propeller system according to an embodiment of the invention.
Figure 5A:
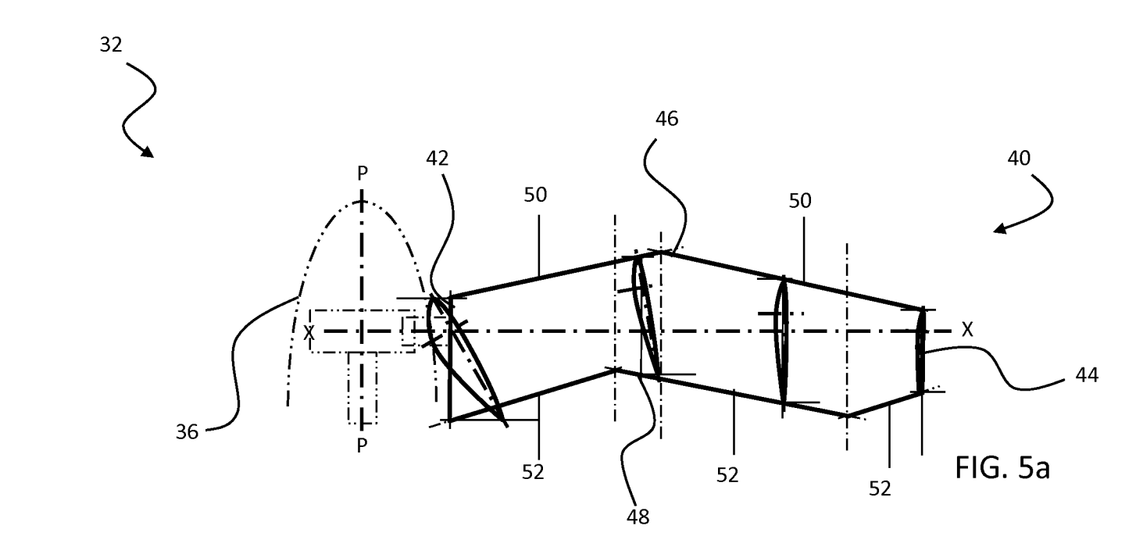
FIG. 5a is a plan view of a propeller blade of the propeller system of FIG. 3 according to an embodiment of the invention.
Figure 5B:
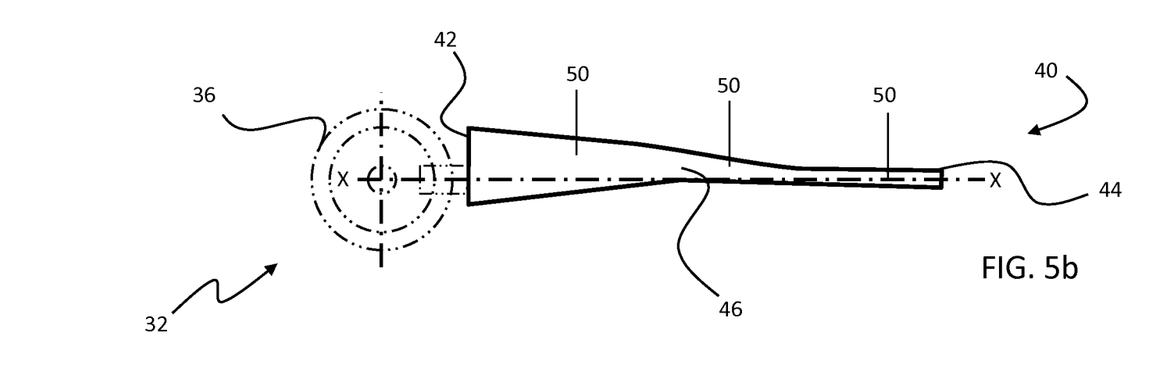
FIG. 5b is a front view of a propeller blade of the propeller system of FIG. 3 according to an embodiment of the invention.

As shown in FIGS. 4-6, each propeller blade 40 includes a leading edge 46 and an opposite trailing edge 48. The leading edge 46 is configured to provide the initial contact between the blade 40 and an adjacent medium, for example air, and the trailing edge 48 is configured to provide the final contact between the blade 40 and the medium. At least one of the leading edge 46 and the trailing edge 48 of each blade 40 includes a facet (i.e. generally planar surface). The leading edge 46 includes at least one facet 50. For example, the leading edge 46 of the blade 40 illustrated in FIG. 6a has a single facet 50. The leading edge 46 of the blade 40 illustrated in FIG. 6b has two facets 50. The leading edge 46 of the blade 40 illustrated in FIG. 6c includes three facets 50. The leading edge 46 of the blade 40 shown in FIG. 6d includes four facets 50. Alternatively, or in addition, the trailing edge 48 may include one or more facets 52, such as two, three, or four facets 52 as illustrated in the FIGS. However, a leading edge 46 and a trailing edge 48 having any number of facets 50, 52, respectively is within the scope of the invention.

As illustrated from the plan view and front view of the propeller system 32 in FIGS. 5a-5b, each facet 50, 52 may be non-uniform in width over its length and may be angled in multiple planes. However, the cross-section of the propeller blade 40, perpendicular to the pitch axis X, remains an airfoil shape over the length of the blade 40. In embodiments including a plurality of facets 50, 52 on either the leading or trailing edges 36, 38, respectively, adjacent facets 50, 52 are generally arranged at an angle relative to one another.

Figure 6A:
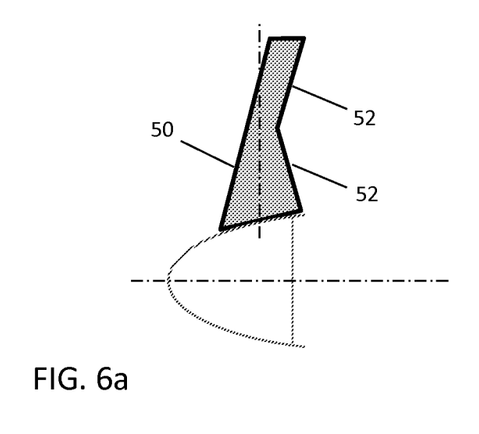
FIGS. 6a-6d are cross-sectional views of propeller blades of the propeller system according to an embodiment of the invention.
Figure 6B:
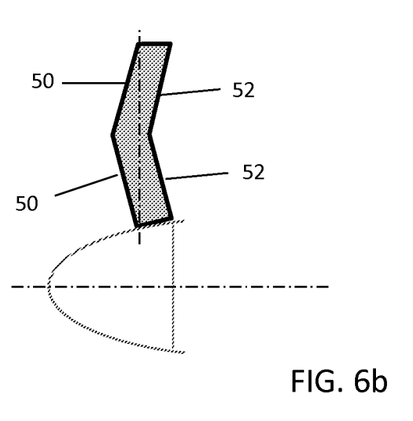
Figure 6C:
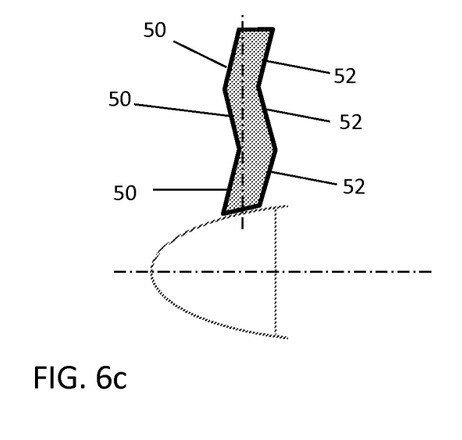
Figure 6D:
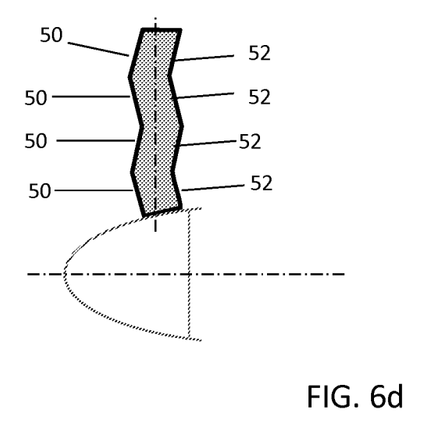
Figure 7:
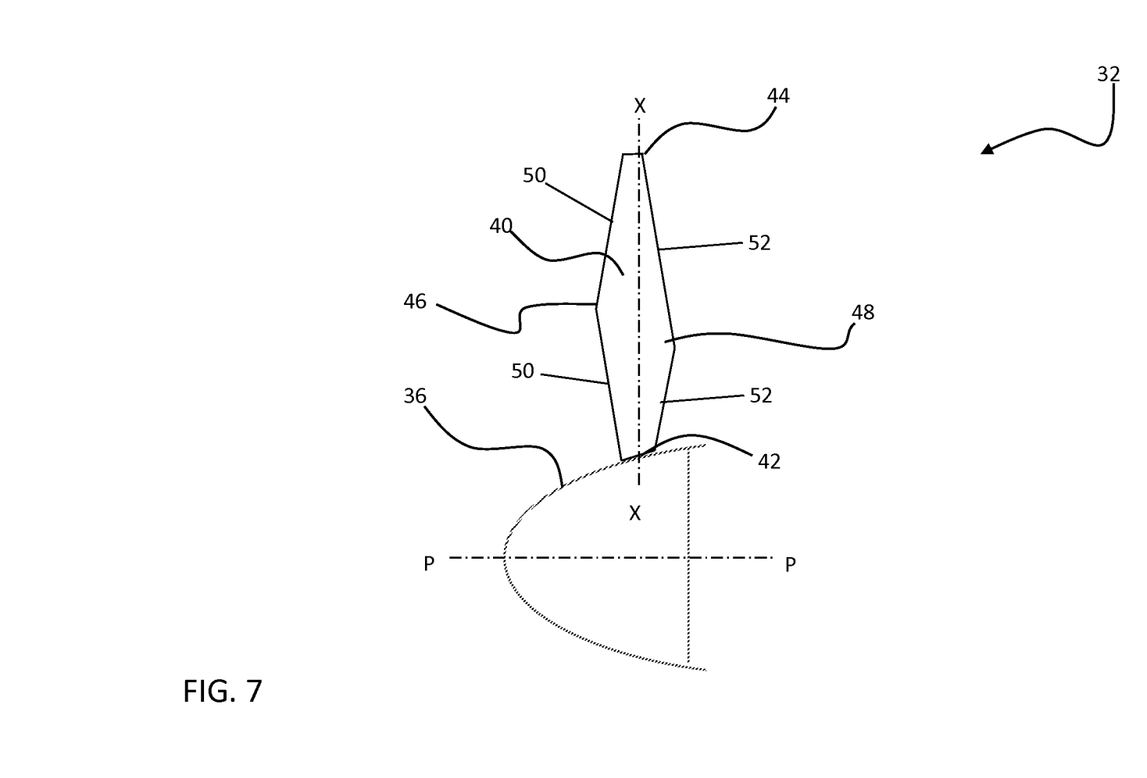
FIG. 7 is a cross-sectional view of a propeller blade of the propeller system according to another embodiment of the invention.

The leading edge 46 and the trailing edge 48 of a blade 40 may have the same number or a different number of facets 50, 52. In instances where the leading 46 and trailing edges 48 have the same number of facets 50, 52, the length of each facet 50, 52 and the angle between adjacent facets 50, 52 of each edge 46, 48 may be similar such that the contour of the leading edge 46 and the contour of the trailing edge 48 are substantially identical (FIGS. 6b-6d). However, as illustrated in FIG. 7, in embodiments where the leading edge 46 and the trailing edge 48 include the same number of facets 50, 52, respectively, the size and orientation of each facet 50, 52 and/or the angle between adjacent facets 50, 52 may vary such that the contour of the leading edge 46 and the contour trailing edge 48 are substantially different.

The facetted geometry of the propeller blade 40 may be selected based on the application of the thrust system 30 to minimize certain attributes generated by the rotating propeller blades 40, including acoustics and noise signatures. In one embodiment, the propeller blade 40 is designed to minimize a centrifugal effect on the propeller hub 36.

By including one or more facets 50, 52 on the leading edge 46 and/or the trailing edge 48 of each of a plurality of propeller blades 40, the loads acting on each blade 40 are redistributed. This load redistribution results in an improved noise signature of the blades 40. In addition, inclusion of the facets 50, 52 reduces the quantity of aerodynamic surfaces of the blade 40 while improving the weight, drag, and aspect ratio of the blade 40.

While shown with facets 50, 52 on both the leading edge 46 and trailing edge 48, it is understood that, in other aspects, only one of the leading and trailing edges 46, 48 has facets. In these embodiments, the other one of the leading and trailing edges 46, 48 could be non-faceted and have, for instance, a curved shape.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while described in the context of a propeller in air, aspects could be used for propellers in water. Further, while described in terms of aircraft, it is understood that aspects could be used in the context of wind turbines. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propeller blade operable to rotate about an axis of rotation comprising:
    a leading edge comprising a first leading edge facet intersecting with a second leading edge facet at a first non-linear angle defining a first vertex, each leading edge facet comprising a respective linear portion of the leading edge, and the first leading edge facet extending from an inboard end to the second leading edge facet; and
    a trailing edge comprising a first trailing edge facet intersecting with a second trailing edge facet at a second non-linear angle defining a second vertex, each trailing edge facet comprising a respective linear portion of the trailing edge, the trailing edge being arranged opposite the leading edge and forming an airfoil there between,
    the first vertex being arranged on a first plane, the second vertex being arranged on a second plane distinct from the first plane, and each plane being orthogonal to the axis of rotation.

2. The propeller blade according to claim 1, wherein a width of at least one of the leading edge facets and trailing edge facets varies over a length of the propeller blade.

3. The propeller blade according to claim 1, further comprising:
    a plurality of leading edge facets and trailing edge facets including the first and second leading edge facets, and the first and second trailing edge facets,
    wherein a number of leading edge facets is identical to a number of trailing edge facets.

4. The propeller blade according to claim 1, further comprising:
    a plurality of leading edge facets and trailing edge facets including the first and second leading edge facets, and the first and second trailing edge facets,
    wherein a number of leading edge facets is different from a number of trailing edge facets.

5. The propeller blade according to claim 1, wherein a contour of the leading edge defined by the leading edge facets is substantially identical to a contour of the trailing edge defined by the trailing edge facets.

6. The propeller blade according to claim 1, wherein a contour of the leading edge defined by the leading edge facets is substantially different from a contour of the trailing edge defined by the trailing edge facets.

7. The propeller blade according to claim 1, wherein the inboard end intersects with the first trailing edge facet at a third non-linear angle defining a third vertex, the third vertex being arranged on a third plane, the third plane being distinct from the first and second planes, and each plane being orthogonal to the axis of rotation.

8. The propeller blade according to claim 7, wherein the third plane is situated inward from the first plane and the second plane.

9. The propeller blade according to claim 7, wherein the first leading facet and the second leading edge facet are arranged at respective non-linear angles to the third plane.

10. An aircraft comprising:
    an airframe;
    at least one engine mounted to the airframe; and
    a thrust system operably coupled to the at least one engine, the thrust system including:
    a hub; and
    a plurality of propeller blades, each propeller blade operable to rotate about an axis of rotation, and each blade comprising:
    a leading edge comprising a first leading edge facet intersecting with a second leading edge facet at a first non-linear angle defining a first vertex, each leading edge facet comprising a respective linear portion of the leading edge, and the first leading edge facet extending from an inboard end to the second leading edge facet; and
    a trailing edge comprising a first trailing edge facet intersecting with a second trailing edge facet at a second non-linear angle defining a second vertex, each trailing edge facet comprising a respective planar linear portion of the trailing edge, the trailing edge being arranged opposite the leading edge and forming an airfoil there between,
    the first vertex being arranged on a first plane, the second vertex being arranged on a second plane distinct from the first plane, and each plane being orthogonal to the axis of rotation.

11. The aircraft according to claim 10, further comprising:
    a plurality of leading edge facets and trailing edge facets including the first and second leading edge facets, and the first and second trailing edge facets,
    wherein a number of leading edge facets is identical to a number of trailing edge facets.

12. The aircraft according to claim 10, wherein a contour of the leading edge defined by the leading edge facets is substantially identical to a contour of the trailing edge defined by the trailing edge facets.

13. The aircraft according to claim 10, wherein a contour of the leading edge defined by the leading edge facets is substantially different from a contour of the trailing edge defined by the trailing edge facets.

14. The aircraft according to claim 10, wherein the aircraft is an unmanned aerial vehicle.

15. The aircraft according to claim 10, wherein a width of at least one of the leading edge facets and trailing edge facets varies over a length of the propeller blade.

16. The aircraft according to claim 15, further comprising:
a plurality of leading edge facets and trailing edge facets including the first and second leading edge facets, and the first and second trailing edge facets,
wherein a number of leading edge facets is different from a number of trailing edge facets.

17. The aircraft according to claim 10, wherein the inboard end intersects with the first trailing edge facet at a third non-linear angle defining a third vertex, the third vertex being arranged on a third plane, the third plane being distinct from the first and second planes, and each plane being orthogonal to the axis of rotation.

18. The aircraft according to claim 17, wherein the third plane is situated inward from the first plane and the second plane.

19. The aircraft according to claim 17, wherein the first leading facet and the second leading edge facet are arranged at respective non-linear angles to the third plane.

* * * * *